(12) United States Patent
Szeteli et al.

(10) Patent No.: US 11,926,517 B2
(45) Date of Patent: Mar. 12, 2024

(54) CONTAINER MANAGEMENT SYSTEM

(71) Applicant: AS Strömungstechnik GmbH, Ostfildern (DE)

(72) Inventors: Andreas Szeteli, Filderstadt (DE); Nico Fischer, Filderstadt (DE)

(73) Assignee: AS Strömungstechnik GmbH, Ostfildern (DE)

( * ) Notice: Subject to any disclaimer, the term of this patent is extended or adjusted under 35 U.S.C. 154(b) by 712 days.

(21) Appl. No.: 17/013,710

(22) Filed: Sep. 7, 2020

(65) Prior Publication Data
US 2021/0087043 A1 Mar. 25, 2021

(30) Foreign Application Priority Data
Sep. 19, 2019 (EP) .................................. 19198349

(51) Int. Cl.
*B67D 7/14* (2010.01)
*B67D 1/08* (2006.01)
*B67D 7/34* (2010.01)
*G06K 7/10* (2006.01)
*G06K 19/07* (2006.01)

(52) U.S. Cl.
CPC ......... *B67D 1/0888* (2013.01); *B67D 1/0801* (2013.01); *G06K 7/10366* (2013.01); *G06K 19/0723* (2013.01); *B67D 2001/0811* (2013.01)

(58) Field of Classification Search
CPC .......... B67D 7/145; B67D 7/348; B65B 3/04; G07F 17/0092
See application file for complete search history.

(56) References Cited

U.S. PATENT DOCUMENTS

| 9,580,294 B2* | 2/2017 | Lewis | B67D 7/344 |
| 2004/0172160 A1* | 9/2004 | O'Dougherty | H01L 21/67294 700/231 |
| 2011/0082595 A1* | 4/2011 | Mehus | B67D 7/145 700/283 |
| 2013/0214469 A1* | 8/2013 | Terzini | B23Q 1/032 269/287 |
| 2018/0075506 A1* | 3/2018 | Burkhard | B65G 23/23 |
| 2019/0332995 A1* | 10/2019 | Tseng | G06Q 10/06 |

FOREIGN PATENT DOCUMENTS

| DE | 102012104170 A1 | 5/2013 |
| DE | 102013109799 A1 | 3/2015 |
| EP | 2511227 A1 | 10/2012 |
| GB | 2550232 A | 11/2017 |
| WO | 02100728 A2 | 12/2002 |

* cited by examiner

*Primary Examiner* — Timothy R Waggoner
(74) *Attorney, Agent, or Firm* — Michael Soderman

(57) ABSTRACT

A container management system (1) with a number of containers (2) which have identifying, electronically readable codes assigned to them, and with a number of dispensing/filling stations configured for dispensing a liquid from the container (2) or supplying said container with a fluid. The dispensing/filling stations are associated with electronic reading units by means of which the codes of containers (2) can be read. Data read by the electronic reading units are fed into a cloud-based computer system (13) configured for storing and analyzing the data.

14 Claims, 2 Drawing Sheets

CONTAINER MANAGEMENT SYSTEM

CROSS REFERENCE TO RELATED APPLICATIONS

This application claims the priority of EP 19198349.3 filed on 2019 Sep. 19; this application is incorporated by reference herein in its entirety.

BACKGROUND

The invention relates to a container management system and a method for operating the container management system.

Such container management systems generally comprise a number of containers in which liquids, in particular chemicals, are stored.

It is known to use automatic dispensing systems for dispensing liquids.

Such a dispensing system is known from DE 10 2013 109 799 A1.

The dispensing systems described therein is used for filling and emptying containers and comprises a container closure which is inserted into a container opening of a container, wherein said container opening accommodates a bung head. A riser pipe connected to the bung head has a dispensing connection element connected to the riser pipe or the bung head. Moreover, a transponder generating transponder signals is provided, wherein a monitoring signal is generated based on the transponder signals indicating whether a permissible connection of the dispensing connection element is present at the container.

This ensures a mix-up-proof connection of a container closure to a container.

Moreover, the dispensing system has a control unit controlling the supply of liquid to the container and/or the dispensing of liquid from the container based on the monitoring signal of the transponder.

The automatic control realized with the control unit takes place in such a way that liquid is only dispensed from a container or filled into said container when a permissible connection of the dispensing connection element to the respective container is reported with the monitoring signal, so that mismatches are reliably prevented.

SUMMARY

The invention relates to a container management system (1) with a number of containers (2) which have identifying, electronically readable codes assigned to them, and with a number of dispensing/filling stations configured for dispensing a liquid from the container (2) or supplying said container with a fluid. The dispensing/filling stations are associated with electronic reading units by means of which the codes of containers (2) can be read. Data read by the electronic reading units are fed into a cloud-based computer system (13) configured for storing and analyzing the data.

DETAILED DESCRIPTION

It is the object of the invention to provide a container management system with a high degree of functionality.

The features of the independent claims are intended to solve this problem. Advantageous embodiments and appropriate further developments of the invention are described in the dependent claims.

The invention relates to a container management system with a number of containers which have identifying, electronically readable codes assigned to them, and with a number of dispensing/filling stations configured for dispensing a liquid from the container or supplying said container with a liquid. The dispensing/filling stations are associated with electronic reading units by means of which codes of containers can be read. Data read by the electronic reading units are fed into a cloud-based computer system configured for storing and analyzing the data.

The invention further relates to a method for operating the container management system.

An essential advantage of the invention is that using the cloud-based computer system enables the monitoring of distributed, in particular even of globally distributed container systems and systems for emptying and/or filling of containers associated with said container systems.

For this purpose, data of containers obtained by electronic reading units and transmitted to the cloud-based computer system can be stored and analyzed in the cloud-based computer system. Advantageously, the cloud-based computer system is also configured for carrying out control and monitoring functions, in particular based on the data read with the electronic reading units. The data stored in the cloud-based computer system can be used by consumers as well as suppliers of the liquids stored in the containers. Moreover, the data stored in the cloud-based computer system can be used to automate work processes performed with containers. In particular, the cloud-based computer system is also able to perform measures to increase error security during such work processes.

The containers of the system according to the invention are generally unambiguously identified by an electronically readable code. Each dispensing/filling station, by means of which liquid can be dispensed from a container or can be supplied to said container, being associated with an electronic reading unit which reads the code of the respective container and transmits said code to the cloud-based computer system enables the cloud-based computer system to monitor whether the container is associated with the correct dispensing/filling station.

The containers may be nearly arbitrarily designed. In principle, the containers may be in the form of bottles. Advantageously, larger containers such as drums are provided. In the latter case, a dip tube, a bung or a coupling may be provided as a container connection. In principle, the containers may also be in the form of tankers.

The dispensing/filling stations may also be of any design. In particular, the dispensing/filling stations may be designed in the form of heads that can be connected to the container connections. This is in particular advantageous in the case where the containers have dip tubes through which liquids can be dispensed from the respective containers or can be supplied to said containers. Depending on the requirements, the heads may be designed as dispensing heads or filling heads.

Because the codes can be predefined in large numbers, the container management system according to the invention can be used for a large number of containers with all containers being unambiguously identifiable via the codes.

The electronic reading units are each associated with a dispensing/filling station, wherein the association is fixed and stored in the cloud-based computer system. It is particularly advantageous that an electronic reading unit may be permanently connected to the dispensing/filling stations, in particular when the reading unit is designed in the form of a head.

Due to this association and by reading the codes of containers, the cloud-based computer system can check and monitor whether a container is connected to the correct dispensing/filling station, i.e. the cloud-based computer system can prevent the mismatching of containers and dispensing/filling stations.

According to an advantageous embodiment, the electronic codes are stored on a chip which respectively is integrated in the connection of a container. In particular, the chip is an RFID chip.

The chips may have a high storage capacity and may be integrated in the connections of the containers in a space-saving manner. In the simplest setup, a passive RFID chip is used, on which only a single sequence of numbers is stored as the code.

Analogous to designing the chip as RFID chip, each electronic reading unit advantageously is an RFID reading unit.

Advantageously, the respective electronic reading unit is permanently associated with the removal/filling station, preferably integrated in the head, whereby an unambiguous, permanent association of the electronic reading unit with the head is given.

It is also advantageous that data of the container and/or data of a liquid accommodated in the container are stored on a chip of a container.

These data are stored on the chip in addition to the code identifying the container.

Basic data may already be stored on the chip when it is activated at the factory. This can include in particular hardware data of the container which, for example, identifies the connection type, more particularly, item, serial or order numbers.

To these basic data container data may be added which in particular comprise container specifications that are more particularly specified as container item numbers or container order numbers or the remaining service life of the container.

The container data may be captured by scanning barcodes on the respective container with a barcode reader and then be read onto the chip. The container data can also be entered directly onto the chip.

Moreover, chemical data, i.e. data identifying the liquid in the respective container, can be stored on the chip, whereby a barcode reader can be used for this purpose also or said data is directly input in the cloud.

These chemical data include chemical specifications of the respective liquid, perhaps its remaining service life as well as a safety data sheet.

The total of the data contained on the chips can be read by an associated electronic reading unit and transmitted to the cloud-based computer system.

According to an advantageous configuration of the container management system, electronic reading units are connected to an interface unit individually or in groups, said interface unit being connected to the cloud-based computer system via a wirelessly operating data transmission unit.

Advantageously, at least one control unit is connected to an interface unit, by means of which dispensing and/or filling processes of containers can be controlled.

It is generally also possible to combine an electronic reading unit and an interface unit into a single assembly. For example, the electronic reading unit can be moveably connected to the interface unit using a cable and an inductor. The entire electronics of both units may be integrated in the interface unit.

The interface units are formed by gateways which are connected to the electronic reading units and the control units via wired and/or wireless data connections.

Advantageously, the interface units are connected to the cloud-based computer system via wirelessly operating data transmission units because the interface units and the cloud-based computer system are distributed units. Wired data transmissions within a company network that is connected to the Internet are also possible.

Advantageously, the connection takes place via Internet connections, wherein preferably secure data transmissions are used.

According to an advantageous embodiment, control commands for dispensing and/or filling processes are generated by means of the cloud-based computer system based on data transmitted by means of electronic reading units.

Thus dispensing and filling processes of all containers of the overall system are controlled via the cloud-based computer system.

Particularly advantageously the control is arranged such that the control commands are send to control units by the cloud-based computer system.

With the control commands, the cloud-based computer system accurately specifies how the control units control the individual control processes, in particular dispensing and filling processes of containers.

Thus, the cloud-based computer system accurately specifies and monitors the functions of all control units.

It is especially advantageous that, in response to a valid code of a container read by an electronic reading unit and the transmission of said code to the cloud-based computer system, said cloud-based computer system generates an enable signal for a dispensing or filling process for this container as a control command.

This type of control prevents the mismatching of dispensing/filling stations with containers.

According to an advantageous embodiment of the invention, the cloud-based computer system generates status messages for containers based on data from the electronic reading units.

In particular, fill levels of containers, positions of containers or error states for containers are generated as status messages.

The current status of all containers in the container management system is thus recorded based on time, preferably in real time, in the cloud-based computer system and can be tracked for monitoring purposes by users of the cloud-based computer system.

Based on the determined status of the containers in the overall system, document management can also be performed in the cloud-based computer system. With the delivery of liquids, in particular chemicals, stored in containers, suitable documentation must also be prepared and provided. This includes certificates of analysis, specifications and also safety data sheets. All of these documents are managed in the cloud-based computer system.

Current status reports on the condition of the containers can also be generated as documentation.

The continuous recording of all containers and the liquids stored in them in the cloud-based computer system also ensures end-to-end traceability of these products.

Here it is particularly advantageous that the current positions of the individual containers are tracked with the cloud-based computer system. The current positions can be stored in the individual chips of the containers and in the cloud. It is particularly advantageous that each chip is associated with a GPS receiver for this purpose.

Moreover, it is possible to record when and where containers are filled or emptied. It is in particular possible to record for how long a container is connected to a dispensing/filling station. By means of self-learning algorithms, it is possible to determine when a container will be empty and when the next container must be delivered to the dispensing/filling station. Block chain technologies also allow for tamper-proof recording, which is important for safety-critical applications in the pharmaceutical, biopharmaceutical and semiconductor industries.

Also, the seamless tracking of the containers means that the data fed into the cloud-based computer system can in particular be used to detect error conditions.

It is also possible to control the disposal of containers. Thus containers can be picked up at their service location and it is no longer necessary to deliver them back to the chemical supplier.

This allows the cloud-based computer system to determine whether the service life of liquids in containers or the container itself has been exceeded. Incorrect deliveries of containers can also be detected. It is also possible to detect when containers are being connected to the wrong heads.

In the event that contaminated or non-compliant chemicals are detected in containers, the cloud-based computer system can trigger a blocking signal, i.e. a blocking of the respective container, to avoid damages or danger for personnel. This blocking can be carried out in real time, in particular such that a user of the cloud-based computer system stops the process, so that, for example, the respective container can no longer be emptied.

Moreover, the cloud-based computer system can generate warning messages when a container is connected incorrectly to a head, for example, and cannot be filled or emptied. The cloud-based computer system can also generate a warning message when it is determined that the service life of a liquid in a container is expired. Such messages or warning messages are generally generated when malfunctions during the production process of the handling of the containers are discovered. These messages or warning messages are preferably sent to suitable addressees such as chemical suppliers or chemical users.

Moreover, the data collected in the cloud-based computer system can be used for production process control.

Based on the data, such as for example the fill status of containers or the number of containers in circulation, the cloud-based computer system can automatically trigger procurement processes such as orders for new containers. Moreover, container warehousing can also be controlled via the cloud-based computer system.

DETAILED DESCRIPTION OF THE PREFERRED EMBODIMENTS

Figure 1:
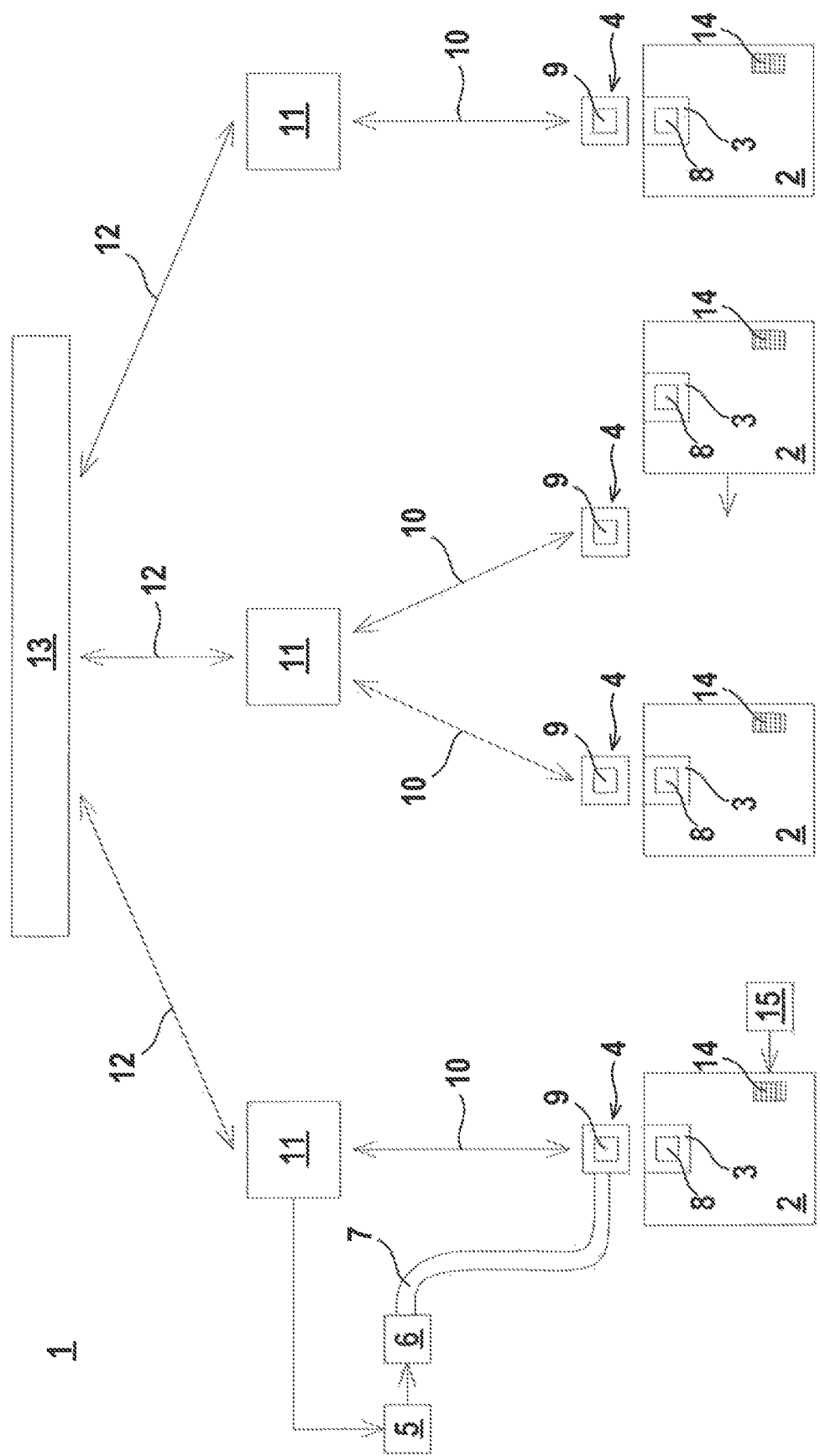
FIG. 1: Schematic representation of an exemplary embodiment of the container management system according to the invention.

FIG. 1 shows a schematic of an exemplary embodiment of the container management system 1 according to the invention.

The container management system 1 serves for automated handling of containers 2 containing liquids, in particular chemicals. The containers 2 may be designed as bottles, canisters or, as illustrated in FIG. 1, in the form of drums.

Each container 2 has a connection 3 to which a dispensing/filling station, here a head 4, may be connected, via which liquid can be removed from the container 2 or can be supplied to it. The emptying or filling of the container 2 takes place automatically, as exemplified for the left container 2 in FIG. 1.

In this case, the head 4 is designed as a dispensing head. After connecting the dispensing head to the connection 3 of the container 2, a pump 6 can be activated via a control unit 5, by means of which pump liquid is being pumped out of the container 2 via a line 7 and the dispensing head.

Figure 2:
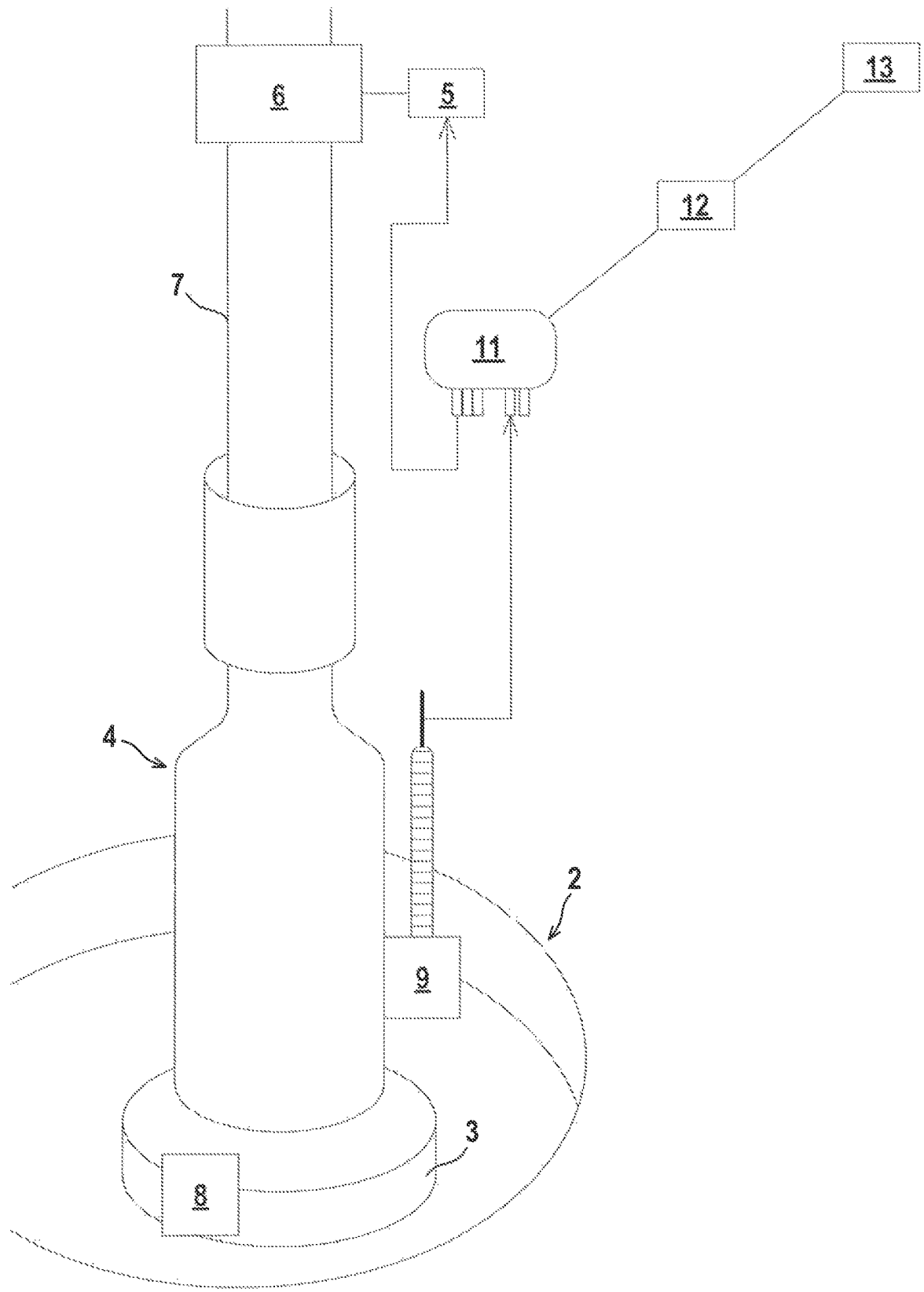
FIG. 2: Detailed representation of a section of the container management system according to FIG. 1.

FIG. 1 shows a configuration of multiple containers 2 which may be arranged at different locations. The configuration of multiple containers may also comprise a significantly higher number of heads 4 and containers 2, as illustrated in FIG. 2. Each container 2 may be connected to a head 4 for dispensing or filling a liquid. For this purpose, the heads 4 may be associated with pumps 6 controlled by control units 5, wherein one control unit 5 may control several pumps 6 and several heads 4 may be connected to one pump 6.

According to the present invention, each container 2 has a chip, in particular in its connection 3, on which chip an electronically readable code is stored which unambiguously identifies the container 2. In the present case, the chips are designed as RFID chips 8.

An electronic reading unit in the form of an RFID reading unit 9 is integrated in each head 4. In principle, the electronic reading unit may also be spatially associated with the head 4 without a physical connection. If a container 2 is connected to the head 4, the RFID chip 8 integrated in the connection 3 is within the reading range of the RFID reading unit 9 so that said RFID reading unit is able to read the code from the RFID chip 8. The RFID chip 8 may also be arranged separately on the container 2.

According to the present invention, the heads 4 are connected individually or in groups to interface units 11 via wired or wireless data connections 10. The control units 5 are also connected to the interface units 11 via the data connections 10. The interface units 11 are designed as gateways that are each connected to a cloud-based computer system 13 via a data transmission unit 12 in the form of an Internet connection. The cloud-based computer system 13 has a distributed arrangement of computing units in the form of process computers and web servers.

As shown in FIG. 1, the individual containers 2 are identified with barcodes 14. Encoded in the barcodes 14 are container data specifying the containers 2 and chemical data specifying the liquid in the respective container 2. The data encoded in the barcodes 14 are readable with barcode readers 15.

FIG. 2 shows a specific design of the container management system 1 according to FIG. 1. In FIG. 1, the top of a container 2 is shown in the form of a drum, wherein a connection 3 in the form of a bung is provided on this top. Joint to this bung is a dip tube, not shown, which is inserted into the internal volume of the drum.

A head 4 in the form of a dispensing head is placed on the connection 3. The dispensing head has a threaded coupling for fixing said dispensing head to the connection 3.

An RFID chip 8 is integrated in the bung. An RFID reading unit 9 is attached laterally on the dispensing head. The RFID reading unit 9 is connected to a gateway forming an interface unit 11 which is connected with the cloud-based computer 13 via an Internet connection as a data transmission unit 12.

A line 7 leads from the dispensing head to a pump 6 which is controlled by a control unit 5 in the form of a PLC control. The control unit 5 is also connected to the gateway.

The operating principle of the container management system 1 is such that the cloud-based computer system 13 controls the entire container handling, in particular also dispensing or filling processes of the containers 2 that are to be carried out using heads 4.

For this purpose, not only container 2 codes are stored on the RFID chip 8. In addition, basic data are stored there which specify the connection 3 of the container 2, for example. Moreover, the container data and the chemical data are stored on the respective RFID chip 8. For this purpose, the barcode 14 of the container 2 is read using the barcode reader 15. The data obtained thereby are stored on the RFID chip 8.

Moreover, the current container position can be stored on the RFID chip 8 or in the cloud using a GPS receiver, for example.

When connecting a container 2 to a head 4, the RFID reading unit 9 on the head 4 reads the data from the RFID chip 8 of the container 2 and transmits said data to the cloud-based computer system 13.

Based on all such data transmitted to the cloud-based computer system 13, the cloud-based computer system 13 documents, monitors and controls the container management system 1.

In particular, control commands for dispensing and/or filling processes are generated by means of the cloud-based computer system 13 based on data transmitted by means of electronic reading units.

The cloud-based computer system 13 outputs the control commands to control units 5.

In particular, in response to a valid code of a container 2 read by an electronic reading unit and the transmission of said code to the cloud-based computer system 13, said cloud-based computer system generates an enable signal for a dispensing or filling process for this container 2 as a control command.

This way, all dispensing and filling processes are controlled by the cloud-based computer system 13. In particular, a correct association of containers 2 with heads 4 is monitored using the cloud-based computer system 13.

Moreover, the cloud-based computer system 13 analyzes status messages of the containers 2. This includes their position, fill level and the like.

Moreover, the cloud-based computer system 13 generates status messages for the containers 2 based on data from the reading units.

For example, fill levels of the containers 2, positions of the containers 2 or error states for the containers 2 are generated as status messages.

In particular, the cloud-based computer system 13 generates documentation and/or time-based status reports based on status messages.

Furthermore, the cloud-based computer system 13 generates control commands and/or messages for procurement processes and warehousing processes based on status messages.

Finally, the cloud-based computer system 13 can generate blocking messages or warning messages based on status messages.

The container management system according to the invention allows for end-to-end traceability of the containers (2). In particular, it is possible to record when and where containers (2) are filled or emptied. It is also possible to record for how long a container (2) was connected to a dispensing/filling station. It is also possible to predict when a container (2) at a dispensing/filling station will be empty and when the next container (2) must be delivered. It is also possible to control the disposal of the containers (2).

LIST OF REFERENCE NUMERALS (1) Container management system
(2) Container
(3) Connection
(4) Head
(5) Control unit
(6) Pump
(7) Line
(8) RFID chip
(9) RFID reading unit
(10) Data connection
(11) Interface unit
(12) Data transmission unit
(13) Cloud-based computer system
(14) Barcodes
(15) Barcode reader

The invention claimed is:

1. A container management system (1) with a number of containers (2) which have identifying, electronically readable codes assigned to them, and with a number of dispensing/filling stations configured for dispensing a liquid from the container (2) or supplying said container with a liquid, characterized in that electronic reading units are associated with the dispensing/filling stations, by means of which codes of containers (2) are readable, in that data read by electronic reading units are fed to a cloud-based computer system (13) which is designed for storing and analyzing the data, and in that monitoring of distributed systems, even globally distributed container systems and systems for emptying and filling of containers associated with said container systems, is enabled with the cloud-based computer system, wherein electronic reading units are connected to an interface unit (11) individually or in groups, said interface unit being connected with the cloud-based computer system (13) via a wirelessly operating data transmission unit (12), wherein at least one control unit (5) is connected to the interface unit (11), wherein control commands for dispensing and/or filling processes are generated by means of the cloud-based computer system based on data transmitted by means of electronic reading units, wherein dispensing and filling processes of all containers of the overall system are controlled via the cloud-based computer system, and wherein control commands are sent to control units by the cloud-based computer system, wherein with the control commands, the cloud-based computer system accurately specifies how the control units control the individual control processes, in particular dispensing and filling processes of containers, and the cloud-based computer system accurately specifies and monitors the functions of all control units.

2. The container management system (1) according to claim 1, characterized in that the electronic codes are stored on a chip respectively integrated in the connection (3) of a container (2).

3. The container management system (1) according to claim 2, characterized in that the chip is an RFID chip and in that each electronic reading unit is an RFID reading unit.

4. The container management system (1) according to claim 1, characterized in that an electronic reading unit is integrated in a dispensing/filling station.

5. The container management system (1) according to claim 2, characterized in that data of the container (2) and/or data of a liquid accommodated in the container (2) are stored on a chip of a container (2).

6. The container management system (1) according to claim 1, characterized in that an electronic reading unit forms an assembly with an interface unit (11).

7. The container management system (1) according to claim 6, characterized in that dispensing and/or filling processes of containers (2) are controllable by at least one control unit.

8. The container management system (1) according to claim 1, characterized in that by means of the cloud-based computer system (13) control commands for dispensing and/or filling processes are generated based on data transmitted by means of the electronic reading units, wherein the control commands are send to control units (5) by the cloud-based computer system (13).

9. The container management system (1) according to claim 8, characterized in that in response to a valid code of a container (2) read by an electronic reading unit and the transmission of said code to the cloud-based computer system (13), said cloud-based computer system generates an enable signal for a dispensing or filling process for this container (2) as a control command.

10. The container management system (1) according to claim 1, characterized in that the cloud-based computer system (13) generates status messages for containers (2) based on data from the electronic reading units.

11. The container management system (1) according to claim 10, characterized in that fill levels of containers (2), positions of containers (2) or error states for containers (2) are generated as status messages and/or blocking signals or warning signals are generated.

12. The container management system (1) according to claim 10, characterized in that the cloud-based computer system (13) generates control commands and/or messages for procurement processes and warehousing processes based on status messages.

13. The container management system (1) according to claim 10, characterized in that the cloud-based computer system (13) generates documentation and/or time-based status reports based on status messages.

14. A method for operating a container management system (1) with a number of containers (2) which have identifying, electronically readable codes assigned to them, and with a number of dispensing/filling stations, each of which is connectable to a connection (3) of a container (2) for dispensing a liquid from the container (2) or supplying said container with a liquid, characterized in that electronic reading units are associated with the dispensing/filling stations, by means of which codes of containers (2) are readable and in that data read by electronic reading units are fed to a cloud-based computer system (13) which is designed for storing and analyzing the data, and in that monitoring of distributed systems, even globally distributed container systems and systems for emptying and filling of containers associated with said container systems, is enabled with the cloud-based computer system, wherein electronic reading units are connected to an interface unit (11) individually or in groups, said interface unit being connected with the cloud-based computer system (13) via a wirelessly operating data transmission unit (12), wherein at least one control unit (5) is connected to the interface unit (11), wherein control commands for dispensing and/or filling processes are generated by means of the cloud-based computer system based on data transmitted by means of electronic reading units, wherein dispensing and filling processes of all containers of the overall system are controlled via the cloud-based computer system, and wherein control commands are sent to control units by the cloud-based computer system, wherein with the control commands, the cloud-based computer system accurately specifies how the control units control the individual control processes, in particular dispensing and filling processes of containers, and the cloud-based computer system accurately specifies and monitors the functions of all control units.

* * * * *